United States Patent [19]
Dole et al.

[11] Patent Number: 5,603,484
[45] Date of Patent: Feb. 18, 1997

[54] PLASTIC SLEEVED ROTARY VALVE

[75] Inventors: Douglas R. Dole, Whitehouse Station, N.J.; Scott D. Madara, Easton, Pa.

[73] Assignee: Victaulic Company of America, Easton, Pa.

[21] Appl. No.: 428,866

[22] Filed: Apr. 25, 1995

[51] Int. Cl.⁶ .................................................. F16K 51/00
[52] U.S. Cl. .......................... 251/148; 251/367; 251/305
[58] Field of Search .................................. 251/367, 148, 251/305

[56] References Cited

U.S. PATENT DOCUMENTS

| | | | |
|---|---|---|---|
| 2,747,831 | 5/1956 | Van Deventer | 251/367 |
| 3,192,613 | 7/1965 | Allen | 251/367 |
| 3,194,270 | 7/1965 | Viessmann | 251/367 |
| 4,141,538 | 2/1979 | Bake et al. | 251/367 |
| 4,653,725 | 3/1987 | Nanz et al. | 251/367 |
| 5,082,633 | 1/1992 | Stuper | 251/367 |

*Primary Examiner*—A. Michael Chambers
*Attorney, Agent, or Firm*—Abelman, Frayne & Schwab

[57] ABSTRACT

A rotary valve disc is provided internally of a single continuous length of pipe, and is secured therein by a segmented pipe coupling, thus eliminating requirement for two independent pipes and a separate seating for the valve disc, and permitting a reduction in the wall thickness of the pipe, particularly of pipes of plastics material.

8 Claims, 2 Drawing Sheets

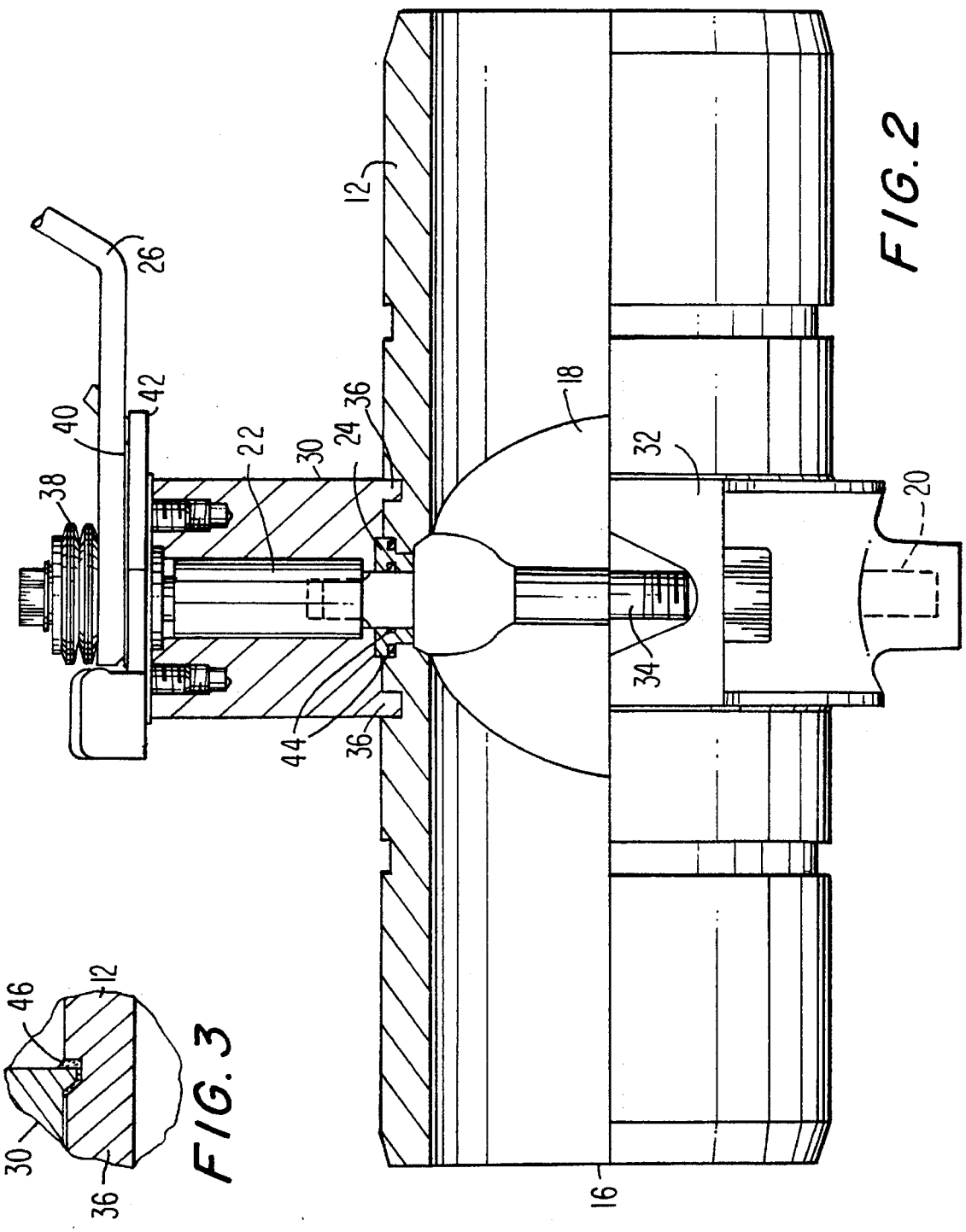

PLASTIC SLEEVED ROTARY VALVE

FIELD OF THE INVENTION

This invention relates to a disc valve for incorporation into a conduit. While not limited thereto, the rotary valve of the present invention finds particular utility in conduits comprised of pipe fabricated from plastics material. The invention also finds equal applicability in iron pipe, and also in thin-walled pipe such as stainless steel pipe.

BACKGROUND OF THE INVENTION

Rotary valves are well-known in the art, those valves including a valve seating, and a valve disc cooperating with the valve seating, the valve disc being rotatable externally of the valve between an opened and a closed position.

Segmented pipe couplings also are well-known in the art, those couplings including two or more coupling segments having keys that are received within cut or roll-formed grooves in the adjacent ends of pipes, and which are bolted down onto the pipes by traction bolts, the segmented pipe coupling incorporating a sealing gasket that spans the adjacent ends of the pipes, and which is forced into compressive engagement therewith upon tightening down of the traction bolts.

It also is previously known from McClennan U.S. Pat. 5,018,704, issued May 28, 1991 and McClennan U.S. Pat. 5,018,548 also issued May 28, 1991, to form a disc valve as a complete unit, which is positioned between the adjacent ends of pipes, and, which is then secured in that position by a segmented pipe coupling having appropriately configured coupling segments.

Such a rotary valve and pipe coupling combination, however, is of greatest utility when used for coupling metal pipes, and encounters a disadvantage when employed with plastics pipes.

For such a segmented pipe coupling to be secured to the adjacent ends of pipes, it is necessary that the ends of the pipes be grooved for them to receive the securing keys of the respective coupling segments.

While this poses no problem in metal pipes, which are of considerable strength, and which readily can be grooved by cut-grooving or roll-grooving, plastics pipes pose a particular problem in that they are structurally considerably less strong than metal pipes, particularly at the groove required in the plastics pipe in order to accommodate the keys of the coupling segments, that groove commonly having been formed by cut-grooving.

At the cut-groove, the wall thickness of the pipe has been very considerably reduced by the depth of the cut-groove. Particularly in plastics pipe, this represents a major structural weakness in the piping system, unless compensated for by employing plastics pipe having a wall thickness that has been increased in thickness by an amount equal to the depth of the cut-groove.

This, however, results in either an increase in the external diameter of the plastics pipe if the internal diameter is to be maintained at a standard diameter, or conversely, the reduction in the inner diameter of the plastics pipe in the event that an increase in the external diameter of the plastics pipe is not permissible.

If the external diameter of the plastic pipe is to be increased, then, this requires step-down couplings for connecting the pipe to corresponding standard pipe. In the alternative, a decrease in the pipe internal diameter results in a reduction in the flow capacity of the assembled pipe line.

An increase in the wall thickness of plastics pipe becomes necessary when the segmented pipe coupling is employed to join two independent lengths of plastics pipe, which in turn requires the cut-groove in the exterior of the respective pipes to be positioned closely adjacent the end of that pipe.

This, however, presents a source of weakness in the plastics pipe, particularly in the event that the pipe line is subjected to axial bending moments. If the moment is sufficient, this can result in either ripping off of the pipe end in the location of the groove, or, deflection, bending and other distortions of that portion of the pipe that extends between the pipe end and the groove, with a possibility of the pipe pulling out of the segmented pipe coupling, possibly with disastrous consequences.

Clearly, it would be a major advantage if the plastic pipe could continue continuously and without interruption through the segmented pipe coupling.

OBJECT OF THE INVENTION

It is an object of this invention to provide a rotary valve that is supported within a segmented pipe coupling, and in which, the requirement for separate pipes is eliminated, the pipe extending continuously through the segmented pipe coupling.

The ends of the pipe extending on opposite sides of the segmented pipe coupling can then be secured to adjacent pipes by any convenient means, including direct solvent cement joints in the case of plastics piping, or, by segmented pipe couplings in the case of metal pipe.

The major advantage of the present invention is when used in conjunction with plastics piping, which is inherently weaker than standard metal pipe, and even thin-walled metal pipe such as stainless steel pipe. As will be appreciated, the basic concept of the present invention, in certain circumstances, also will have application particularly in thin-walled metal pipe such as stainless steel pipe, and, in high-pressure applications, also in standard metal pipe.

SUMMARY OF THE INVENTION

According to the present invention, a rotary valve is provided internally of a continuous length of pipe, that length of pipe extending axially beyond the valve disc and the securing segmented pipe coupling in both axial directions.

The disc valve is assembled internally of the continuous length of pipe, the continuous length of pipe providing the valve seat for the disc valve in the absence of a separate seating.

The disc valve is then located against axial displacement within the pipe by means of a segmented pipe coupling, the segmented pipe coupling being configured to accommodate a valve spindle for operating the disc valve.

The resulting construction is that of a unitary pipe, disc valve and operating mechanism, the pipe then being connectable to existing piping by any suitable means.

DESCRIPTION OF THE DRAWINGS

The invention will now be described with reference to the accompanying drawings, which illustrate a preferred embodiment of the invention, and, in which:

FIG. 2 is a partial longitudinal cross-section through the pipe, showing the valve disc, segmented pipe coupling, and an operating lever for the valve disc; and, FIG. 3 is a fragmentary cross-section through the pipe, showing the manner in which seals can be provided at the keys of the segmented pipe coupling.

DESCRIPTION OF THE PREFERRED EMBODIMENT

Figure 1:
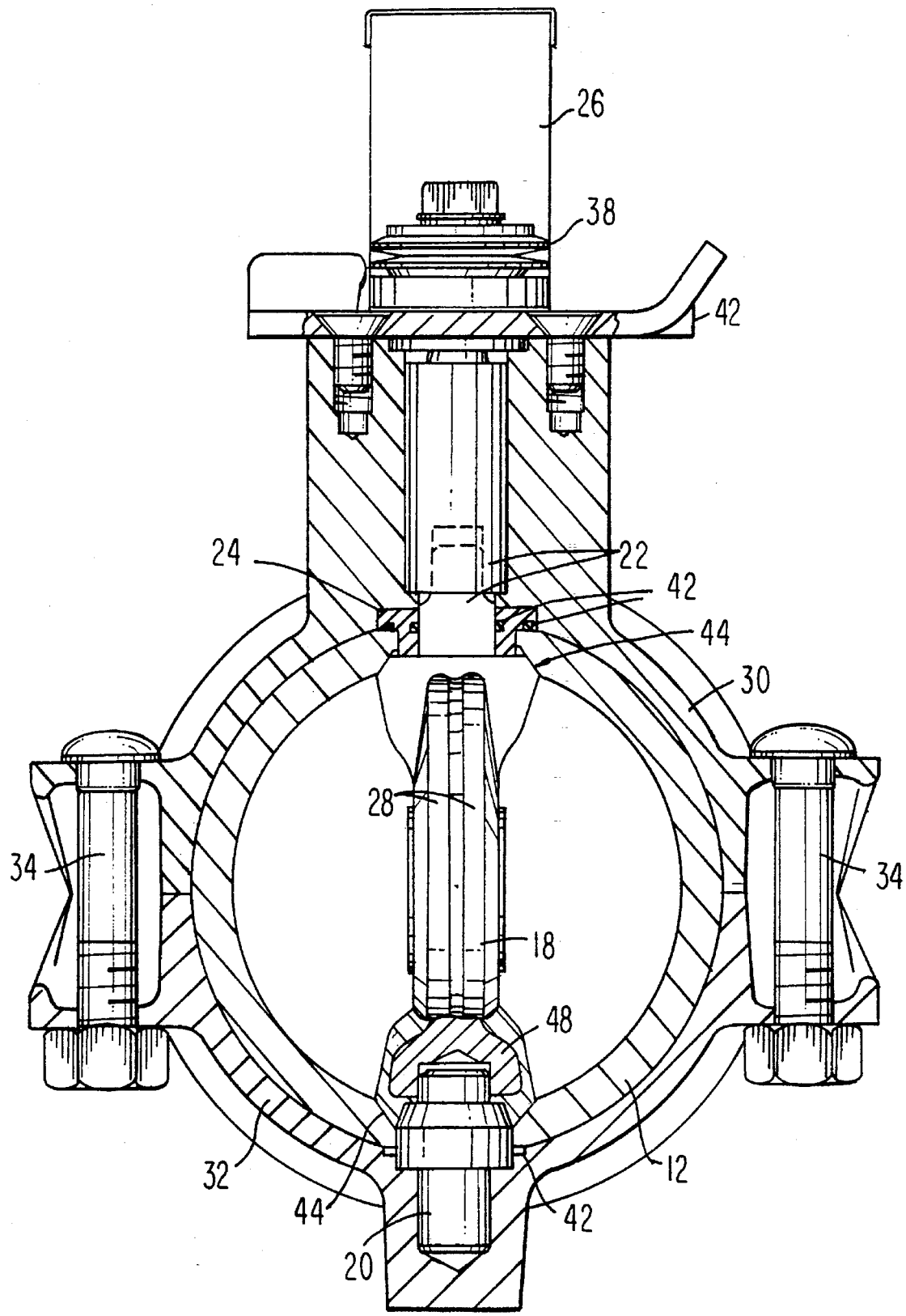
FIG. 1 is a transverse cross-section through the pipe, showing the valve disc and segmented pipe coupling according to the present invention.

Referring now to FIGS. 1 and 2, the first major component of the rotary valve of the present invention is comprised of a pipe 12, which can be fabricated from a suitable plastics material, which optionally can be a reinforced plastics material, the reinforcements being comprised of woven or non-woven glass fibers and the like. The pipe 12 is axially elongate, and extends continuously from the end 14 to the end 16 as a continuous hollow cylinder.

Positioned within the pipe 12, as illustrated centrally of the length of the pipe 12, is a valve disc 18, the valve disc comprising a second major component of the rotary valve of the present invention, the valve disc 18 being supported for rotary movement within the pipe by a journal 20, and rotatable within the pipe by means of a spindle 22, which is journaled in a bearing 24, the spindle being rotatable by an operating handle 26. Movement of the handle 26 between an opened and a closed position causes the valve disc 18, which is shown in the open position, to rotate through 90° into a position in which it extends transversely of the pipe 12, and provides a complete closure for the pipe 12.

As is well-known in the art, the valve disc can be provided with sealing lands 28 formed of a resilient material, the sealing lands 28, in the closed position of the valve disc, acting to seal against the inner circumference of the pipe 12.

Surrounding the pipe 12 is the third major component of the assembly, this being comprised of segmented couplings 30 and 32, which are bolted onto the external circumference of the pipe 12 by means of traction bolts 34. The segmented couplings 30 and 32 each have retaining keys 36 on the inner circumference thereof, which are received in grooves cut in the outer circumference of the pipe 12, thus to inhibit axial movement of the coupling members 30 and 32 axially of the pipe 12, as opposed to the normal function of the keys 36, which is to retain adjacent ends of pipes against axial displacement relative to each other, i.e., the segmented coupling 30 and 32 merely functions as a support and retainer for the spindle 22 of the valve disc 18.

Bellville washers 38 are provided on the valve spindle 22, and provide for positive locking of the operating handle 26 in either of its fully opened or fully closed positions, a detent 40 being provided on the underside of the handle 26, which is received in sockets [not shown] provided in the plate 42, over which the handle 26 and the detent 40 is angularly movable.

O rings 42 are provided on the bearing 24 and the journal 20, in order to prevent fluid flow through the apertures 44 provided in the wall of the tube 12, the apertures 44 being configured as valve seats for the portions of the valve disc adjacent the journal 20 and the spindle 22.

Optionally, and as shown in FIG. 3, a mastic cement 46 can be provided in the grooves that receive the keys 36 of the respective coupling segments 30 and 32, the mastic 46 acting to inhibit movement of the coupling axially of the pipe 12.

Assembly of the valve disc into the pipe 12 is accomplished in the absence of the coupling segments 30 and 32, and, the absence of the bearing 24. The valve disc 18 when in the position shown in FIGS. 1 and 2, is passed axially within the pipe 12, until such a time as its spindle is aligned with an aperture 44, at which time the valve disc is rotated about the central axis of the valve disc to bring the spindle 22 into position within one of the apertures 44. The journal 20 is then inserted through one of the apertures into engagement with the socket 48 of the valve disc, and, the bearing 24 is then inserted through the aperture 44 at the opposite diameter of the tube 12 for it to be positioned in surrounding relation with the spindle 22 of the valve disc 18.

The coupling segments 30 and 32 are then applied to the pipe in correct alignment with the journal 20 and the spindle 22, subsequent to which the traction bolts 34 are applied and torqued down, this completing the assemblage of the pipe and rotary valve combination.

As will be apparent, the pipe 12 does not necessarily need to be fabricated from plastics material. It could be standard metal pipe, or equally well be thin-walled pipe, or thin-walled stainless steel pipe. Further, and as will be readily apparent, the actuator for the valve can be of any form, including a screw and gear right-angled drive, which optionally is manually operable or electrically driven.

In use, the pipe 12 together with the totally assembled valve disc and segmented coupling is connected into a piping system. Optionally, the remainder of the piping system also can be formed of plastics pipe, or, it can be comprised of metal pipe. If the piping system is comprised of plastics pipe, then, the pipe 12 can be connected either by butt cementing, solvent cementing or butt fusing to an adjacent pipe, or, can be connected thereto by a compatible segmented pipe coupling, or, similarly can be connected to step-up or step-down connectors, all of which are well-known in the art.

We claim:

1. In combination, a pipe, a valve disc positioned within said pipe, and means for supporting said valve disc for rotation about an axis extending transversely of said pipe, said valve disc being positioned intermediate opposite ends of said pipe, and extending transversely of a longitudinal axis of said pipe, and, means journalling said valve disc for rotation about a diameter of said valve disc, and permitting angular adjustment of said valve disc about said diameter;

further including:
  said pipe being a single length of pipe having opposite ends;
  said valve disc being in direct engagement with an inner periphery of said single length of pipe, whereby, said single length of pipe provides a valve seat for said valve disc;
  journals for said valve disc extending diametrically of said pipe, and extending through diametrically opposed apertures in said pipe; and,
  a segmented pipe coupling secured to an outer periphery of said single length of pipe, said segmented pipe coupling providing a support for said journals of said valve disc.

2. The combination of claim 1, in which said pipe is a pipe fabricated from plastics material.

3. The combination of claim 1, in which said valve disc is positioned centrally of said opposite ends of said pipe.

4. The combination of claim 1, in which said segmented pipe coupling includes a first coupling segment providing a support for a journal of said valve disc, and a second coupling segment providing a journal for an operating shaft of said valve disc.

5. The combination of claim 4, in which said second coupling segment also provides a support for an actuator of said valve disc.

6. The combination of claim 5, in which said actuator is a manually operable lever.

7. The combination of claim 4, in which said first and second coupling segments include keys on an inner periphery of said coupling segments, said keys being received in grooves formed in the outer periphery of said pipe, further including a gasket positioned within each said groove and compressively held therein by said keys.

8. The combination of claim 1, in which said diameter of said valve disc extends perpendicular to said longitudinal axis of said tube.

* * * * *